(12) United States Patent
Kato

(10) Patent No.: US 9,509,188 B2
(45) Date of Patent: Nov. 29, 2016

(54) STATOR OF ROTARY ELECTRIC MACHINE

(71) Applicant: TOYOTA JIDOSHA KABUSHIKI KAISHA, Toyota-cho, Toyota-shi, Aichi-ken (JP)

(72) Inventor: Hiroki Kato, Toyota (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/435,337

(22) PCT Filed: Oct. 3, 2013

(86) PCT No.: PCT/IB2013/002196
§ 371 (c)(1),
(2) Date: Apr. 13, 2015

(87) PCT Pub. No.: WO2014/060807
PCT Pub. Date: Apr. 24, 2014

(65) Prior Publication Data
US 2015/0263576 A1   Sep. 17, 2015

(30) Foreign Application Priority Data

Oct. 19, 2012 (JP) ................................ 2012-232039

(51) Int. Cl.
| | | |
|---|---|---|
| *H02K 3/04* | (2006.01) | |
| *H02K 3/48* | (2006.01) | |
| *H02K 15/04* | (2006.01) | |
| *H02K 3/12* | (2006.01) | |

(Continued)

(52) U.S. Cl.
CPC ................ *H02K 3/12* (2013.01); *H02K 3/493* (2013.01); *H02K 15/064* (2013.01); *H02K 2213/03* (2013.01)

(58) Field of Classification Search
CPC ...... H02K 3/12; H02K 3/493; H02K 15/064; H02K 2213/03
USPC ...................... 310/179–208, 214, 215; 29/596
See application file for complete search history.

(56) References Cited

U.S. PATENT DOCUMENTS

| | | | | |
|---|---|---|---|---|
| 693,579 | A * | 2/1902 | Wait ......................... | H02K 3/12 310/201 |
| 1,721,810 | A * | 7/1929 | Carter .................... | B21D 11/10 29/596 |
| 1,738,166 | A * | 12/1929 | Apple .................... | H02K 13/08 29/598 |
| 1,849,215 | A * | 3/1932 | Apple .................... | H02K 13/08 310/201 |

(Continued)

FOREIGN PATENT DOCUMENTS

| | | |
|---|---|---|
| EP | 0881747 A2 | 12/1998 |
| EP | 1 416 610 A1 | 5/2004 |

(Continued)

*Primary Examiner* — Terrance Kenerly
*Assistant Examiner* — Ahmed Elnakib
(74) *Attorney, Agent, or Firm* — Sughrue Mion, PLLC

(57) ABSTRACT

A stator of a rotary electric machine includes a stator core that includes a plurality of slots; and a plurality of conductor segment coils that each have a U-shape. A sectional area of the U-shaped portion of the conductor segment coil that protrudes out from one side in the axial direction of the stator core is larger than a sectional area of a tip end portion of the conductor segment coil that protrudes out from the other side in the axial direction of the stator core; and the sectional area of the tip end portion of the conductor segment coil that protrudes out from the other side in the axial direction of the stator core is larger than a sectional area of an in-slot portion of the conductor segment coil.

3 Claims, 1 Drawing Sheet

(51) Int. Cl.
*H02K 3/493* (2006.01)
*H02K 15/06* (2006.01)

(56) References Cited

U.S. PATENT DOCUMENTS

| | | | | |
|---|---|---|---|---|
| 5,097,167 A * | 3/1992 | Kanayama | ............... | H02K 3/26 |
| | | | | 310/201 |
| 5,258,681 A * | 11/1993 | Hibino | ............... | H02K 3/493 |
| | | | | 310/214 |
| 5,801,471 A * | 9/1998 | Hill | ............... | H02K 3/12 |
| | | | | 310/179 |
| 5,936,326 A * | 8/1999 | Umeda | ............... | H02K 1/165 |
| | | | | 310/179 |
| 6,388,358 B1 * | 5/2002 | Umeda | ............... | H02K 15/064 |
| | | | | 310/179 |
| 6,476,530 B1 * | 11/2002 | Nakamura | ............... | H02K 3/12 |
| | | | | 310/201 |
| 2002/0043886 A1 * | 4/2002 | Fujita | ............... | H02K 3/12 |
| | | | | 310/201 |
| 2003/0015932 A1 | 1/2003 | Oohashi et al. | | |
| 2003/0135980 A1 * | 7/2003 | Ichikawa | ............... | H02K 3/12 |
| | | | | 29/596 |
| 2003/0163912 A1 * | 9/2003 | Tokizawa | ............... | H02K 15/0414 |
| | | | | 29/596 |
| 2003/0164656 A1 | 9/2003 | Sakurai | | |

FOREIGN PATENT DOCUMENTS

| | | |
|---|---|---|
| GB | 23548 A | 0/1912 |
| JP | H 05-308737 | 11/1993 |
| JP | 2002-262500 A | 9/2002 |
| JP | 2003-032933 A | 1/2003 |
| JP | 2003-259584 A | 9/2003 |
| JP | 2006-340409 | 12/2006 |
| JP | 2011-135733 A | 7/2011 |

* cited by examiner

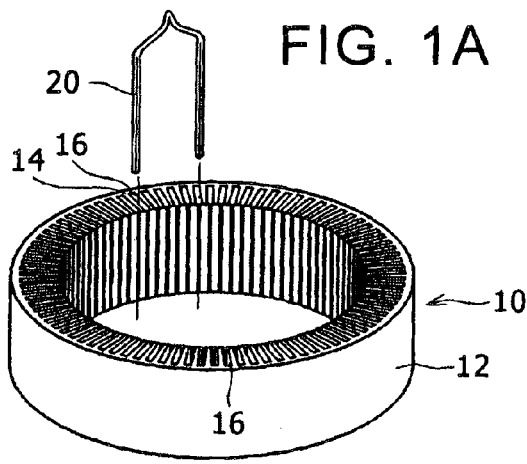
FIG. 1A
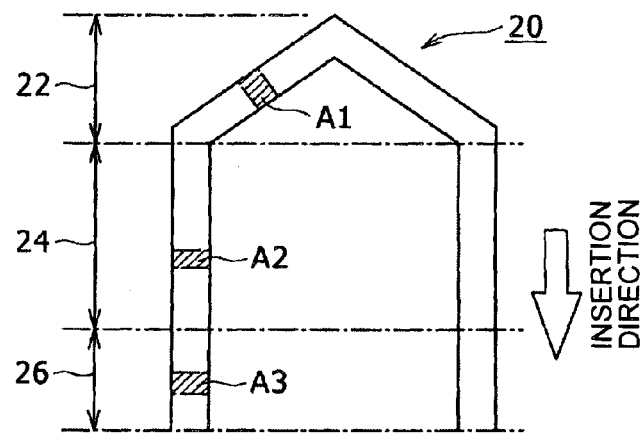
FIG. 1B
FIG. 2A
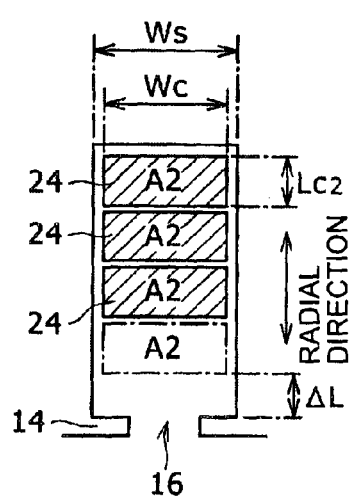
FIG. 2B
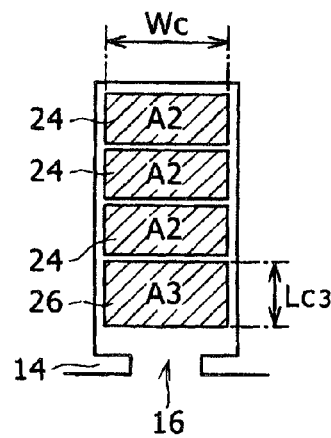
FIG. 2C
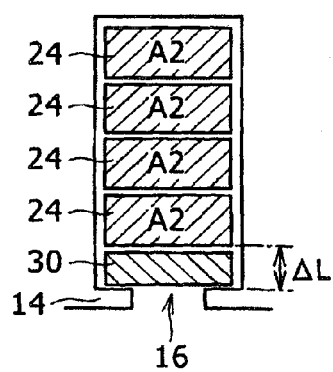

STATOR OF ROTARY ELECTRIC MACHINE

BACKGROUND OF THE INVENTION

1. Field of the Invention

The invention relates to a stator of a rotary electric machine, and more particularly, to a stator of a rotary electric machine in which a winding is formed using a conductor segment coil.

2. Description of Related Art

To form a coil that is wound around a stator of a rotary electric machine, a U-shaped conductor segment is inserted into a slot from one side in an axial direction of a stator core, and a tip end portion that protrudes on the other side in the axial direction is bent and sequentially connected.

For example, Japanese Patent Application Publication No. 2011-135733 (JP 2011-135733 A) describes a coil of a stator core of a rotary electric machine in which a conductor of a single sectional area is wound according to related art, wherein a sectional area of a slot portion is made smaller than the single sectional area, and a sectional area of a coil end portion is made larger than the single sectional area.

Also, Japanese Patent Application Publication No. 2003-259584 (JP 2003-259584 A) describes technology in which a slot portion of a conductor segment used in a stator of an alternating current generator for a vehicle is deformed by rolling or the like so as to have a generally rectangular shaped cross-section, and a turn portion of the conductor segment has a cross-section that remains the cross-section of round wire.

Japanese Patent Application Publication No. 2003-32933 (JP 2003-32933 A) describes technology related to a conductor segment used in a stator of an alternating current generator for a vehicle, in which, when a sectional area of a coil end portion is designated A1, a sectional area of a slot portion is designated A2, and a sectional area of an end portion is designated A3, in a first example embodiment A2 and A3 remain having rectangular cross-sections and A1 is press-formed so as to have a circular cross-section, and in a second example embodiment A1 and A2 remain having rectangular cross-sections and A3 is press-formed so as to have a circular cross-section, and in a third example embodiment A2 remains having a rectangular cross-section and A1 and A3 are press-formed so as to have circular cross-sections, and in a fourth example embodiment A2 remains having a circular cross-section and A1 and A3 are press-formed so as to have rectangular cross-sections.

When the conductor sectional area of the coil is decreased, the space factor of the conductor in the slot of the stator core improves, but resistance becomes greater and copper loss increases. If the conductor sectional area of the coil end portion is increased as it is in JP 2011-135733 A, JP 2003-259584 A, and JP 2003-32933 A, copper loss at that portion is able to be reduced. However, when a conductor segment coil is used, the U-shaped portion and the portion on a tip end of a leg portion become the coil end, and if the sectional area of the portion at the tip end is increased, insertability into the slot decreases (i.e., it is more difficult to insert the conductor segment coil into the slot).

SUMMARY OF THE INVENTION

Therefore, the invention provides a stator of a rotary electric machine capable of suppressing copper loss while ensuring insertability of the conductor segment coil.

One aspect of the invention relates to a stator of a rotary electric machine. This stator includes a stator core that includes a plurality of slots, the stator core having a preset space on an innermost radial side of each slot; and a plurality of conductor segment coils that each have a U-shape, each conductor segment coil being assembled in a corresponding one of the slots by the segment coil being inserted into the slot from one side in an axial direction of the stator core and a portion of the conductor segment coil that protrudes out on the other side in the axial direction of the stator core being bent. A sectional area of the U-shaped portion of the conductor segment coil that protrudes out from one side in the axial direction of the stator core is larger than a sectional area of a tip end portion of the conductor segment coil that protrudes out from the other side in the axial direction of the stator core, and the sectional area of the tip end portion of the conductor segment coil that protrudes out from the other side in the axial direction of the stator core is larger than a sectional area of an in-slot portion of the conductor segment coil.

In the stator according to this aspect of the invention, a dimension of the tip end portion of the conductor segment coil that protrudes out from the other side in the axial direction of the stator core along a circumferential direction of the slot may be equal to a dimension of the in-slot portion of the conductor segment coil along the circumferential direction of the slot, and a dimension of the tip end portion of the conductor segment coil that protrudes out from the other side in the axial direction of the stator core along a radial direction of the slot may be larger than a dimension of the in-slot portion of the conductor segment coil along the radial direction of the slot.

In the stator according to the aspect of the invention described above, a spacer may be arranged in the preset space.

According to this structure, the sectional area of both the coil end portion on one side and the coil end portion on the other side in the axial direction when the conductor segment coil is assembled to the stator core is able to be increased, so copper loss is able to be suppressed. Also, by removing the spacer provided on the innermost side of the slot when inserting the conductor segment coil into the slot, insertability into the slot will not be lost even if the sectional area of the tip end portion of the conductor segment coil is large.

BRIEF DESCRIPTION OF THE DRAWINGS

Features, Advantages, and Technical and Industrial Significance of Exemplary Embodiments of the Invention Will be Described Below with Reference to the Accompanying Drawings, in which Like Numerals Denote Like Elements, and Wherein:

FIGS. 1A and 1B are views of a stator of a rotary electric machine according to one example embodiment of the invention, and a conductor segment coil inserted into this stator, with FIG. 1A being a perspective view of the stator of a rotary electric machine into which the conductor segment coil is inserted, and FIG. 1B being a view of the sectional area of each portion of the conductor segment coil; and FIGS. 2A, 2B, and 2C are views illustrating the procedure according to which a conductor segment is inserted into a slot of the stator of the rotary electric machine according to the example embodiment, with FIG. 2A being a view showing additional space before a spacer is inserted, FIG. 2B being a view showing a tip end portion of a conductor segment coil, which has a large sectional area, inserted using this additional space, and FIG. 2C being a view showing a spacer inserted after the conductor segment coil has been inserted into the slot.

DETAILED DESCRIPTION OF EMBODIMENTS

Example embodiments of the invention will now be described in detail with reference to the accompanying drawings. Hereinafter, the rotary electric machine is described as a three-phase synchronous rotary electric machine, but this is only an example for the description. The rotary electric machine may be any rotary electric machine that uses a conductor segment coil. Hereinafter, the cross-section of the conductor segment coil is described as being rectangular in shape, but a rectangular shape also includes a rectangular shape in which the corner portions are suitably rounded. Also, the rectangular shape is only an example for the description. The cross-section may also be circular in shape, or elliptical in shape, or the like.

The number of slots in the stator core described below, and the number of conductor segment coils arranged in one slot and the like are only examples for the description, and may be modified as appropriate according to the specifications of the stator of the rotary electric machine.

Hereinafter, like or corresponding elements in the drawings will be denoted by like reference characters and redundant descriptions will be omitted.

FIG. 1A is a view of a stator 10 of a rotary electric machine. The rotary electric machine is a three-phase synchronous rotary electric machine. Hereinafter, unless otherwise noted, the stator 10 of the rotary electric machine will simply be referred to as "stator 10". FIG. 1A is a perspective view of a conductor segment coil 20 assembled to a stator core 12 of the stator 10, and FIG. 1B is a view showing a frame format of the sectional area of each portion of the conductor segment coil 20. The stator 10 is combined with a rotor, not shown, to form the rotary electric machine. The stator 10 rotates the rotor by working in cooperation with the rotor in terms of electromagnetic action by energizing a winding coil formed by assembling the conductor segment coil 20, and outputs torque to a rotating shaft of the rotor.

The stator 10 includes a stator core 12, a plurality of teeth 14 arranged in a circumferential direction on the stator core 12, slots 16 that are spaces between adjacent teeth 14, and a winding coil formed by a conductor segment coil 20 being inserted and assembled in the slots 16. Hereinafter, portions such as the slots 16 that are provided in plurality may be referred to in the singular to facilitate understanding.

The stator core 12 is an annular-shaped magnetic member with the plurality of teeth 14 arranged on an inner peripheral side. The stator core 12 is formed by a plurality of magnetic steel sheets having a predetermined shape that are stacked together.

The conductor segment coil 20 is used to form the winding coil. The conductor segment coil 20 is such that a conductor with a rectangular cross-section is bent in a U-shape. Here, the U-shape refers to a state in which the conductor segment coil 20 is bent and forms a coil end portion. The coil end portion may be formed by bending a single coil, or the coil end-portion may be formed by bending an end portion of one conductor segment coil 20 and an end portion of another conductor segment coil 20 and welding them together.

An insulation coating is provided on the surface of the conductor segment coil 20. A highly conductive metal may be used as the material of the conductor. Copper or the like is one possible example of a highly conductive metal. A polyamide-imide enamel coating may be used for the insulation coating. The thickness of the insulation coating is determined by the insulation specifications of the stator 10 and the like. One example of the thickness is approximately 30 to 50 μm. A polyester imide, a polyimide, a polyester, or a formal or the like may be used as the enamel coating used for the insulation coating.

The winding coil is formed using the conductor segment coil 20 in the manner described below. The tip end portions of two leg portions of the conductor segment coil 20 are inserted from one side in the axial direction of the stator core 12, into two slots 16 separated by a predetermined number of slot spaces in the circumferential direction of the stator core 12. FIG. 1 is a view showing the tip ends of the two leg portions of the conductor segment coil 20 inserted one into each of two slots 16 that are separated by six slot spaces, matching three phases, i.e., a U-phase, a V-phase, and a W-phase. In FIG. 1, the one side of the stator core 12 in the axial direction is the upper side along the surface of the paper on which FIG. 1 is drawn.

The tip end portions of the two leg portions inserted into the slots 16 from the one side of the stator core 12 in the axial direction protrude out on the other side of the stator core 12 in the axial direction. The protruding tip end portions are bent on the other side of the stator core 12 in the axial direction, and connected by welding or the like to tip end portions of another conductor segment coil 20 that is inserted into the slots 16 in the same way. The connection with the tip end portions of the other conductor segment coil 20 is performed according to winding specifications of the stator 10. In this way, a plurality of conductor segment coils 20 are assembled to the stator core 12 and connected together to form the winding coil.

A plurality of U-shaped portions are arranged on one side of the stator core 12 in the axial direction, and a plurality of bent and connected tip end portions are arranged on the other side. As a result, a plurality of conductor segment coils 20 are assembled to the stator core 12, thus forming the winding coil. A portion where the winding coil protrudes out in the axial direction of the stator core 12 will be referred to as a coil end. A portion where the plurality of U-shaped portions are arranged is a one-side coil end that protrudes on one side of the stator core 12 in the axial direction. A portion where the plurality of bent tip end portions are arranged is an other-side coil end that protrudes out on the other side of the stator core 12 in the axial direction.

The conductor segment coil 20 includes a U-shaped portion 22 that forms the one-side coil end, an in-slot portion 24 that is arranged in a space along the axial direction of the slot 16 of the stator core 12, and tip end portion 26 that will be bent and be the other-side coil end, as shown in FIG. 1B.

In a cross-section perpendicular to the axial direction of each portion of the conductor segment coil 20, a sectional area of the U-shaped portion 22 is designated A1, a sectional area of the in-slot portion 24 is designated A2, and a sectional area of the tip end portion 26 is designated A3. A1 is set larger than A3, and A3 is set larger than A2. That is, the relationship among A1, A2, and A3 is set such that A1>A3>A2.

Therefore, the sectional area A2 of the in-slot portion 24 is the smallest. Thus, with the same number of windings, the slots 16 are able to be smaller so the size of the stator core 12 is able to be smaller, compared with when the sectional area of the in-slot portion 24 is A1 or A3. Also, the sectional area A1 of the U-shaped portion 22 is the largest. Thus, resistance value at the one-side coil end is able to be lower and copper loss is able to be reduced, compared with when the sectional area of the U-shaped portion 22 is A2. Further, the sectional area A3 of the tip end portion 26 is larger than A2. Thus, copper loss is able to be reduced, compared with when the sectional area of the tip end portion 26 is A2. In this way, the size of the stator core 12 is able to be smaller, and copper loss of the stator 10 is able to be reduced.

The U-shaped portion 22 is not greatly limited by the increase in the sectional area A1 because the U-shaped portion 22 does not need to pass through the slot 16. On the other hand, the tip end portion 26 must pass through the slot 16, so the sectional area A3 is limited by the dimensions of the slot 16. Therefore, A3 is set smaller than A1.

FIGS. 2A, 2B, and 2C are views showing the conductor segment coil 20 passing through the slot 16. FIG. 2A is a view showing three conductor segment coils 20 arranged in the slot 16, before a fourth conductor segment coil 20 is arranged. Here, three conductor segment coils 20 are arranged in the radial direction in the slot 16, but only one conductor segment coil 20 is arranged in the circumferential direction in the slot 16. The sectional area A2 of each conductor segment coil 20 when it is arranged in the slot 16 is A2=WC×LC2. The circumferential direction and the radial direction are indicated by arrows in FIG. 2A, as directions that are orthogonal to each other.

WC is a dimension of a side along the circumferential direction, among the sides that form the rectangular sectional area of the conductor segment coil 20. The dimension WC along the circumferential direction of the conductor segment coil 20 is the same not only for the in-slot portion 24 of the conductor segment coil 20, but also for the U-shaped portion 22 and the tip end portion 26.

LC2 is a dimension of a side along the radial direction in the slot, among the sides that form the rectangular sectional area of the conductor segment coil 20. At the U-shaped portion 22, the dimension along the radial direction of the conductor segment coil 20 is LC1=A1/WC, which is longer than LC2, and at the tip end portion 26, the dimension along the radial direction of the conductor segment coil 20 is LC3=A3/WC, which is longer than LC2 and shorter than LC1.

A width dimension WS of an opening along the circumferential direction of the slot 16 is set slightly wider than WC. A length dimension of an opening along the radial direction of the slot 16 is set longer, by an amount corresponding to a space ΔL, than 4LC2 that is the dimension in the radial direction of four conductor segment coils.

The space ΔL is a radial dimension of a clearance space provided for inserting a spacer 30 (see FIG. 2C). The spacer 30 reduces eddy current loss resulting from leakage flux from the rotor side passing through the conductor segment coil 20 inside the slot 16. A3 that is larger than A2 is able to pass through the slot 16 using this space ΔL as additional space.

FIG. 2B is a view showing the tip end portion 26 of the fourth conductor segment coil 20 passing through the slot 16 using the additional space of the space ΔL. With the sectional area A3 of the tip end portion 26 equal to WC×LC3 (i.e., A3=WC×LC3), LC3 is larger than LC2, but smaller than (LC2+ΔL). Therefore, the tip end portion 26 of the fourth conductor segment coil 20 is able to be inserted into the slot 16 while the three conductor segment coils 20 in FIG. 2A are arranged inside the slot 16.

FIG. 2C is a view showing the fourth conductor segment coil 20 and the in-slot portion 24 arranged in the slot 16, with the tip end portion 26 of the fourth conductor segment coil 20 passing through the slot 16 and protruding out by a predetermined length on the other side of the stator core 12 in the axial direction. In this state, the space ΔL is created on the innermost peripheral side of the slot 16, so the spacer 30 is inserted here.

The spacer 30 is made of strong magnetic material, and attracts magnetic flux from the rotor side so that the magnetic flux will not pass through the conductor segment coil 20. As a result, eddy current loss of the conductor segment coil 20 is reduced. A nickel-iron alloy having magnetic permeability that is several hundred times the magnetic permeability of copper of which the conductor of the conductor segment coil 20 is made may be used as the strong magnetic material used for the spacer 30.

In this way, by removing the spacer 30 provided on the innermost side of the slot 16 when inserting the conductor segment coil 20 into the slot 16, insertability into the slot 16 will not be lost even if the sectional area of the tip end portion 26 of the conductor segment coil 20 is large. Thus, the sectional area of both the coil end portion on one side and the coil end portion on the other side in the axial direction when the conductor segment coil 20 is assembled to the stator core 12 is able to be increased compared to the slot inside portion 24. As a result, copper loss of the stator 10 is able to be suppressed. Also, after a predetermined conductor segment coil 20 is arranged in the slot 16, the spacer 30 made of strong magnetic material is arranged on the innermost side of the slot 16, so eddy current loss of the conductor segment coil 20 is able to be suppressed.

The invention claimed is:

1. A stator of a rotary electric machine, the stator comprising: a stator core that includes a plurality of slots, the stator core having a preset space on an innermost radial side of each slot; and a plurality of conductor segment coils that each have a U-shape, each conductor segment coil being assembled in a corresponding one of the slots with the segment coil being inserted into the slot from one side in an axial direction of the stator core and a portion of the conductor segment coil that protrudes out on the other side in the axial direction of the stator core being bent, wherein a sectional area of the U-shaped portion of the conductor segment coil that protrudes out from one side in the axial direction of the stator core is larger than a sectional area of a tip end portion of the conductor segment coil that protrudes out from the other side in the axial direction of the stator core;

the sectional area of the tip end portion of the conductor segment coil that protrudes out from the other side in the axial direction of the stator core is larger than a sectional area of an in-slot portion of the conductor segment coil, a dimension of the tip end portion of the conductor segment coil that protrudes out from the other side in the axial direction of the stator core along a circumferential direction of the slot is equal to a dimension of the in-slot portion of the conductor segment coil along the circumferential direction of the slot; and a dimension of the tip end portion of the conductor segment coil that protrudes out from the other side in the axial direction of the stator core along a radial direction of the slot is larger than a dimension of the in-slot portion of the conductor segment coil along the radial direction of the slot.

2. The stator of a rotary electric machine according to claim 1, further comprising:

a spacer arranged in the preset space.

3. The stator of a rotary electric machine according to claim 2, characterized in that a conductor of the conductor segment coil is made of a material having a first magnetic permeability value, the spacer is made of a magnetic material having a second magnetic permeability value, and the second magnetic permeability value is equal to or larger than 100 times the first magnetic permeability value.

\* \* \* \* \*